(12) United States Patent
Spangenberg et al.

(10) Patent No.: US 11,947,605 B2
(45) Date of Patent: Apr. 2, 2024

(54) AUTOMATICALLY SEPARATING CLAIM INTO ELEMENTS/LIMITATIONS AND AUTOMATICALLY FINDING ART FOR EACH ELEMENT/LIMITATION

(71) Applicants: Erich Lawson Spangenberg, Paris (FR); Daniel Lawrence Bork, East Kingston, NH (US); Pascal Asselot, Paris (FR); Brian Joshua Berman, Long Island City, NY (US); George Karypis, Bloomington, MN (US)

(72) Inventors: Erich Lawson Spangenberg, Paris (FR); Daniel Lawrence Bork, East Kingston, NH (US); Pascal Asselot, Paris (FR); Brian Joshua Berman, Long Island City, NY (US); George Karypis, Bloomington, MN (US)

(*) Notice: Subject to any disclaimer, the term of this patent is extended or adjusted under 35 U.S.C. 154(b) by 18 days.

(21) Appl. No.: 17/508,959

(22) Filed: Oct. 22, 2021

(65) Prior Publication Data
US 2022/0147584 A1    May 12, 2022

Related U.S. Application Data

(63) Continuation of application No. 16/216,776, filed on Dec. 11, 2018, now abandoned, which is a
(Continued)

(51) Int. Cl.
*G06F 16/953* (2019.01)
*G06F 16/2457* (2019.01)
(Continued)

(52) U.S. Cl.
CPC ...... *G06F 16/953* (2019.01); *G06F 16/24578* (2019.01); *G06F 16/93* (2019.01); *G06Q 50/184* (2013.01); *G06F 2216/11* (2013.01)

(58) Field of Classification Search
None
See application file for complete search history.

(56) References Cited

U.S. PATENT DOCUMENTS 5,950,194 A * 9/1999 Bennett ............... G06F 16/319
707/925
5,982,370 A * 11/1999 Kamper ............... G06F 16/332
707/E17.062

(Continued)

*Primary Examiner* — Kannan Shanmugasundaram
(74) *Attorney, Agent, or Firm* — Olivo IP Law Group, P.C.; John W. Olivo, Jr.

(57) ABSTRACT

A system and method for a patent search and analytics software tool that finds prior art for each claim limitation/element by breaking up claims into individual claim limitations. Once the claims are separated, the system finds the best prior art for each of the individual separate, different claim limitations/elements. Additionally, the software finds the best prior art for entire claims, including non-patent literature (NPL) searching. The system takes into account the limitations of the claim under consideration (query claim of query patent), the text of the art, the link structure of the citation network, and the patent classification and then constructs a network that consists of two types of nodes: (i) the art (patents and non-patent literature) and the (ii) classes of the patent classification. Each art node is linked to all the art nodes that it cites and is linked to all the classification nodes that it belongs to.

6 Claims, 3 Drawing Sheets

Related U.S. Application Data continuation-in-part of application No. PCT/US2018/064186, filed on Dec. 6, 2018, and a continuation-in-part of application No. PCT/US2018/061448, filed on Nov. 16, 2018, and a continuation-in-part of application No. PCT/US2018/059174, filed on Nov. 5, 2018, and a continuation-in-part of application No. PCT/US2018/057062, filed on Oct. 23, 2018, and a continuation-in-part of application No. PCT/US2018/056884, filed on Oct. 22, 2018, and a continuation-in-part of application No. PCT/US2018/056690, filed on Oct. 19, 2018.

(60) Provisional application No. 62/696,357, filed on Jul. 11, 2018, provisional application No. 62/695,126, filed on Jul. 8, 2018, provisional application No. 62/695,002, filed on Jul. 7, 2018, provisional application No. 62/689,241, filed on Jun. 24, 2018, provisional application No. 62/685,937, filed on Jun. 16, 2018, provisional application No. 62/685,960, filed on Jun. 16, 2018, provisional application No. 62/685,299, filed on Jun. 15, 2018, provisional application No. 62/672,697, filed on May 17, 2018, provisional application No. 62/660,946, filed on Apr. 21, 2018, provisional application No. 62/622,987, filed on Jan. 29, 2018, provisional application No. 62/622,994, filed on Jan. 29, 2018, provisional application No. 62/622,922, filed on Jan. 28, 2018, provisional application No. 62/610,265, filed on Dec. 25, 2017, provisional application No. 62/607,919, filed on Dec. 20, 2017.

(51) Int. Cl.
*G06F 16/93* (2019.01)
*G06Q 50/18* (2012.01)

(56) References Cited

U.S. PATENT DOCUMENTS

2005/0283473 A1* 12/2005 Rousso ............... G06F 16/3322
707/999.005
2016/0048936 A1* 2/2016 Perkowski ........... G06Q 50/184
705/310

* cited by examiner

Exemplary
Computer System

AUTOMATICALLY SEPARATING CLAIM INTO ELEMENTS/LIMITATIONS AND AUTOMATICALLY FINDING ART FOR EACH ELEMENT/LIMITATION

PRIORITY CLAIMS

This application is a continuation of U.S. patent application Ser. No. 16/216,776, filed Dec. 11, 2018, which claims the benefit of: U.S. Provisional Patent Application No. 62/607,919, filed Dec. 20, 2017; U.S. Provisional Patent Application No. 62/610,265, filed Dec. 25, 2017; International Patent Application Number PCT/US2018/56690, filed on Oct. 19, 2018; International Patent Application Number PCT/US2018/56884, filed on Oct. 22, 2018; International Patent Application Number PCT/US2018/57062, filed on Oct. 23, 2018; International Patent Application Number PCT/US2018/59174, filed on Nov. 5, 2018; International Patent Application Number PCT/US2018/61448, filed on Nov. 16, 2018; International Patent Application Number PCT/US2018/64186, filed on Dec. 6, 2018; U.S. Provisional Patent Application No. 62/622,922, filed Jan. 28, 2018; U.S. Provisional Patent Application No. 62/622,987, filed Jan. 29, 2018; U.S. Provisional Patent Application No. 62/622,994, filed Jan. 29, 2018; U.S. Provisional Patent Application No. 62/660,946, filed Apr. 21, 2018; U.S. Provisional Patent Application No. 62/672,697, filed May 17, 2018; U.S. Provisional Patent Application No. 62/685,299, filed Jun. 15, 2018; U.S. Provisional Patent Application No. 62/685,937, filed Jun. 16, 2018; U.S. Provisional Patent Application No. 62/685,960, filed Jun. 16, 2018; U.S. Provisional Patent Application No. 62/689,241, filed Jun. 24, 2018; U.S. Provisional Patent Application No. 62/695,002, filed Jul. 7, 2018; U.S. Provisional Patent Application No. 62/695,126, filed Jul. 8, 2018; and U.S. Provisional Patent Application No. 62/696,357, filed Jul. 11, 2018, all of which are incorporated herein by reference.

FIELD OF THE INVENTION

This invention deals with conducting patent searches.

BACKGROUND

When conducting a patent search, it is hard to find one prior art reference that discloses the entire patent application claim (or issued claim in a patent). The first prior art reference found is the primary reference. Therefore, the Patent Examiner or patent searcher needs to subsequently search for a secondary reference to find any limitations not disclosed in the primary reference. It takes additional time to look for a secondary reference. Also, the current process of conducting a patent search presents problems and limitations to finding the most relevant prior art.

SUMMARY OF THE INVENTION

The present invention is an online wireless worldwide patent search and analytics tool that identifies relevant prior art by taking into account the limitations of the claim under consideration (query claim of query patent), the text of the art, the link structure of the citation network, and the patent classification.

The patent search software of the present invention finds prior art for each claim limitation or element. The software automatically breaks up every claim into individual claim limitations. For example, the software can automatically break up a claim into about five (5) separate, different claim limitations or elements. Then, it can find the best prior art for each of the five (5) separate, different claim limitations or elements. This is very helpful when the user cannot find a prior art reference for only part of a claim. For example, if the initial patent search found 90% of the claim, but is missing one or two elements of the claim, it might be better to conduct a search only for the missing elements or limitations.

Also, the present invention's search software finds the prior art for the entire claim, and also includes patent and non-patent literature (NPL) searching.

The present invention features social networking and communications capabilities so that patent searchers can communicate or talk to one another, either privately or publically. The present invention also allows for all of the worldwide Patent Examiners to easily collaborate with each other, through methods such as: instant messaging; video conference; phone; email; and live chat.

The Patent Searchers can save their patent search strategies. That way, other people can review, modify, and improve their search strategies. For example, some patent searchers in other countries could use the same search strategies, after translating the customized search queries into their native home country languages. Likewise, third parties could also use social networking/collaboration features to assist each other with their crowdsourced patentability searches.

The present invention has a reference tab feature, where the user can individually look at each claim separately. Each prior art reference will be ranked from most relevant to least relevant. Each prior art reference has an overall score. The overall score is based on 80% from comparing the patent application claims to the specification text of the prior art reference. The text that is analyzed is not limited to keyword searching. Instead, the relationship of individual words and elements are compared to each other. For each limitation in the query claim, the present invention identifies the text segments that have a similarity that is above a threshold.

The present invention also features a focused limitation search. For each limitation, the user will see the most relevant worldwide prior art references for each limitation. For example, the software could automatically break up the claim into about 5 different claim elements or limitations. Then the search software will find references for each claim limitation.

The present invention is a patent analytics platform featuring a blockchain based patent registry that contains high-level metadata on each patent. The blockchain record for each patent will link to the patent analytics platform, where the full text of the patent (including diagrams) and a wealth of analytic information will be available to view or download. The platform is continuously updated to add patents from additional countries. The objective of the present invention is to eventually capture every patent in the world.

The present invention also provides a sophisticated search tool and analytics data. Two of the key analytics available from the present invention are the "Q-Score," a measure of patent quality, and the "V-Score," a measure of patent validity.

Q Score is the most advanced tool available for ranking the potential commercial value of a patent or a portfolio of patents. Other ranking methods typically rely heavily on a patent's reference graph (citations to/from other patents). Q Score is far more sophisticated: using data mining tokenization techniques, Q Score takes into account multiple factors correlated with patent value.

V Score is a measure of prior art related to the patent. It finds relevant prior art and analyzes how close the art is to what's covered in the patent. The algorithms find prior art that was used to invalidate similar patents. Hence, the present invention can assign a score that indicates how vulnerable a patent might be to challenge.

The present invention will also allow developers capture the data stored in the analytics platform via API for integration into other systems. The present invention also includes tools for claims analysis, in-depth analysis of individual patents, and comparative analysis of a portfolio of patents.

The present invention software features a spam filter that can check all communications, including emails, text, and fax. The software can look for "broken English" or other types of machine translations, that identifies the language appears to be a machine translation, and can check any language. If the software identifies a machine translation, then this will be a factor in the algorithm identifying the email as spam. Also, the software could notify the receiver of the email that there appears to be a machine translation, and the receiver could decide whether or not to open the email, or whether to have it go directly into the designated spam folder, or whether to have email automatically deleted. The receiver can set it up to have any spam emails (or emails that have machine translations) to automatically report the sender as sending spam.

The present invention software can check for bad grammar, or bad misspellings. If there is bad grammar or bad misspellings (such as quantity of misspellings or quality of misspellings, such as large misspellings of easy, simple words), the software could identify that the sender might be from a different country, different native home country language. If the software identifies bad grammar or bad misspelling (such as a person could manually set the number of threshold misspellings or bad grammar), then this will be a factor in the formula/algorithm identifying the email as spam. Also, the software could notify the receiver of the email that there appears to be bad grammar or bad misspellings, and the receiver could decide whether or not to open the email, or whether to have it go directly into spam/junk folder, or whether to have email automatically deleted. The receiver can set it up to have any spam emails (or emails that have bad grammar or bad misspellings) to automatically report the sender as sending spam.

A worldwide spam offender list could be generated. It could keep track of worldwide spammers, and the specific type of spam email, text, telemarketing calls, and fax. That way, the software could be set to automatically block anyone on this worldwide spam list. Some states and countries have anti-spam laws. Blockchain or software could be used to automatically file lawsuits against spammers. For example, the state of Missouri has an anti-spam fax law. Therefore, whenever a fax is received from a spammer, the blockchain or software could automatically report and sue the spammer.

BRIEF DESCRIPTION OF THE DRAWINGS

The various embodiments are illustrated by way of example, and not by way of limitation, in the figures of the accompanying drawings. Having thus described the invention in general terms, reference will now be made to the accompanying drawings, which are not necessarily drawn to scale, and wherein.

DETAILED DESCRIPTION OF THE INVENTION

Figure 1:
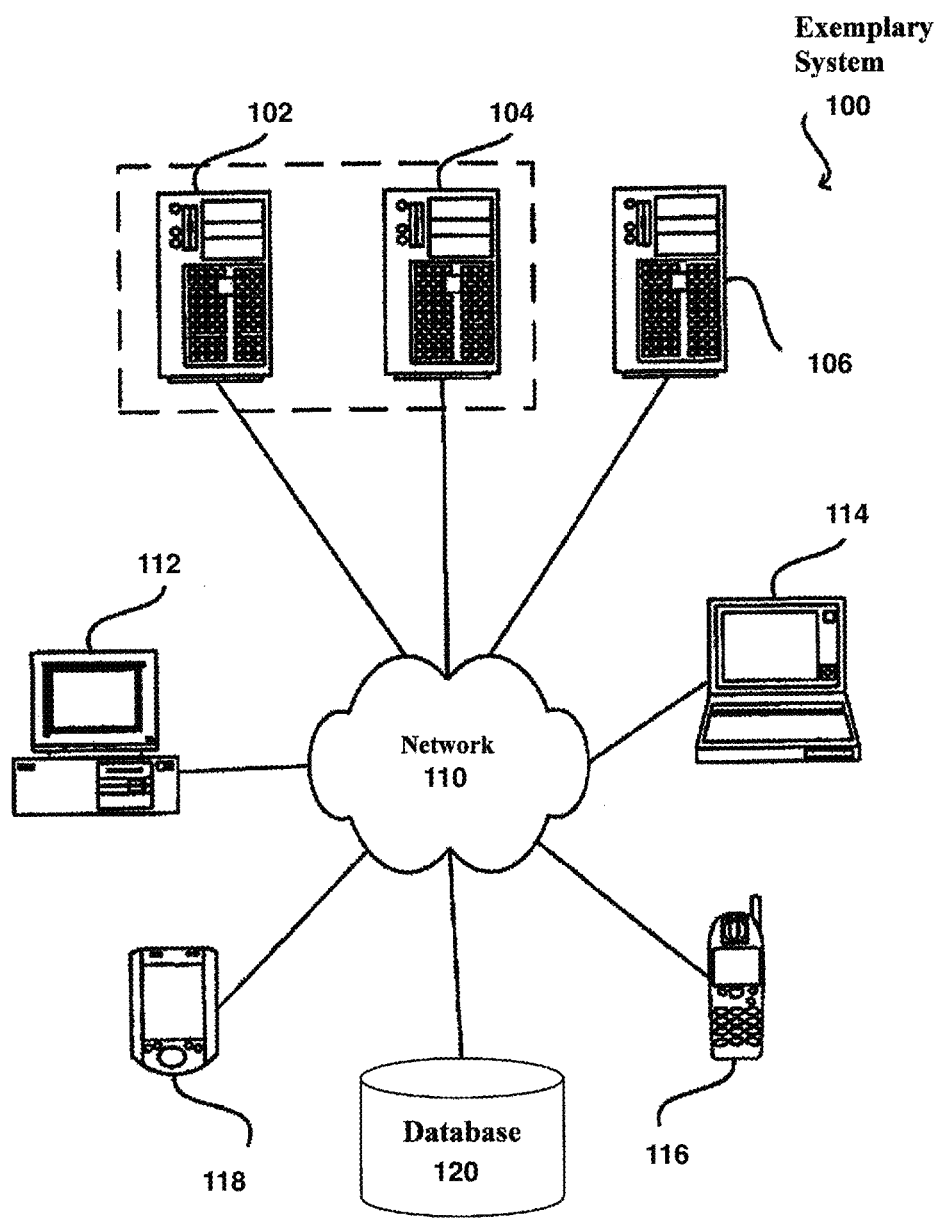
FIG. 1 is an illustration depicting an exemplary operating environment including one or more user computers, computing devices, or processing devices, which can be used to operate a client, such as a dedicated application, web browser is shown.

The present invention, also known as Zuse, is an online wireless worldwide patent search and analytics tool that identifies relevant prior art by taking into account the limitations of the claim under consideration (query claim of query patent), the text of the art, the link structure of the citation network, and the patent classification. The overall process proceeds as follows:

ZUSE constructs a network that consists of two types of nodes: (i) the art (patents and non-patent literature) and the (ii) classes of the patent classification (currently IPCR). Each art node is linked to all the art nodes that it cites and is linked to all the classification nodes that it belongs to. The weights of the first set of edges are determined based on the content similarity of the corresponding arts, whereas the weights of the second set of edges are determined based on the classification strength. If the art corresponds to patents and/or patent applications, their known classifications are used (primary class has higher weight than secondary classes). If the art corresponds to non-patent literature (NPL), their weights are determined by machine-learning classifiers that were estimated from the patents. In addition to the above edges, each classification node is also connected to its parent within the classification scheme being used (the patent classification has a hierarchical structure). We refer to this network as the ACN (art & classification network).

Given a query patent, ZUSE performs a random walk with restart on ACN from the node in ACN that corresponds to the query. Upon convergence, this process determines the steady-state probability of visiting each of the nodes in ACN starting from the query patent. The nodes in ACN that correspond to art with a priority date that is earlier than that of the query patent and for which we have access to their full text are ranked based on their steady-state probabilities and the N highest-ranked nodes are selected. The art corresponding to this set of nodes defines the candidate prior art subset (CPAS) that is being further analyzed by ZUSE in order to determine if it is relevant with respect to the query claim. By leveraging the citation network, the classification hierarchy, and the connections between art and classifications, CPAS contains prior art that is highly related to the query patent because there are many short paths within ACN passing through related art and/or classifications that connect them.

For each limitation in the query claim, ZUSE identifies the text segments in CPAS that have a similarity that is above a threshold (referred to as sufficiently similar segments (SSS)). The similarity is determined by comparing the corresponding words while taking into account variations in word-forms, thesaurus-derived synonyms, and user-supplied synonyms. In addition, when provided, ZUSE takes into account user-supplied information related that relate to "must-have", "important", and "forbidden" terms. Upon completion, ZUSE eliminates from CPAS any art that does not contain at least one SSS to any of the limitations of the query claim. As a result, what remains in CPAS is prior art that is now also related to the query claim in terms of its content (each contains at least one SSS).

For each art in CPAS ZUSE then proceeds to compute five scores: (i) the aggregate similarity of the most similar SSS to each of the limitations, (ii) the textual similarity between the query claim and the art's abstract, (iii) the similarity between the classifications of the query patent and art (that is informed by the hierarchical nature of the classification scheme), (iv) the random-walk distance between the query patent and the art in the ACN, and (v) the similarity between the ancestors of the query patent and the art within the art citation network (i.e., the subset of ACN involving only the art nodes). These five scores are then combined to produce an overall score for each art in CPAS, and the top-scoring prior art documents are returned.

ZUSE's performance is expected to improve over time by leveraging user feedback as well as information extracted from PTAB decisions. The final ranked list depends on various tunable parameters (weights of the edges in ACN, restart probability, initial length of CPAS, SSS minimum similarity, relative importance of the final scores, etc.). Supervised machine-learning approaches can be used to automatically estimate the best set of parameter values by leveraging the information from user feedback and PTAB decisions.

Information from Marksman hearings can be incorporated to construct domain-specific thesauri to be used to improve the limitation-to-segment content similarity. User feedback and PTAB information will allow us to refine how the information from Marksman hearings is used. Access to relevant legal decisions can enable ZUSE to estimate term-to-term semantic similarity models in order to enhance the performance of the thesauri-based content similarity approaches.

By analyzing how users refine the annotation of the limitations, ZUSE can learn to identify the words/concepts within the limitations that need to be present in a SSS to be considered relevant prior art. Zuse can improve the similarity between the query claim and the content of the prior art by taking into account how the terminology has changed over the years and how it is used within a claim language and art that corresponds to NPL.

The patent search software of the present invention finds prior art for each claim limitation or element. The software automatically breaks up every claim into individual claim limitations. For example, the software can automatically break up a claim into about five (5) separate, different claim limitations or elements. Then, it can find the best prior art for each of the five (5) separate, different claim limitations or elements. This is very helpful when the user cannot find a prior art reference for only part of a claim. For example, if the initial patent search found 90% of the claim, but is missing one or two elements of the claim, it might be better to conduct a search only for the missing elements or limitations.

Also, the present invention's search software finds the prior art for the entire claim, and also includes patent and non-patent literature (NPL) searching.

The present invention features social networking and communications capabilities so that patent searchers can communicate or talk to one another, either privately or publically. The present invention also allows for all of the worldwide Patent Examiners to easily collaborate with each other, through methods such as: instant messaging; video conference; phone; email; and live chat.

In one embodiment, the patent searcher can save their patent search strategies. That way, other people can review, modify, and improve their search strategies. For example, some patent searchers in other countries could use the same search strategies, after translating the customized search queries into their native home country languages. Likewise, third parties could also use social networking/collaboration features to assist each other with their crowdsourced patentability searches.

The patent searcher can copy and paste claim language from the subject target patent or patent application, or the patent searcher can upload a text (.txt) file. Then, the patent search tool will search for prior art, based on the patent or patent application claim that was entered. First, there is an overall validity score for the entire set of claims. The higher the score represents the higher the probability that the application will be rejected by the prior art. The higher validity score represents more relevant prior art.

The present invention has a reference tab feature, where the user can individually look at each claim separately. Each prior art reference will be ranked from most relevant to least relevant. Each prior art reference has an overall score. The overall score is based on 80% from comparing the patent application claims to the specification text of the prior art reference. The text that is analyzed is not limited to keyword searching. Instead, the relationship of individual words and elements are compared to each other. For each limitation in the query claim, the present invention identifies the text segments that have a similarity that is above a threshold.

The similarity is determined by comparing the corresponding words while taking into account variations in word-forms and thesaurus-derived synonyms. Upon completion, Zuse eliminates any art that does not contain at least one Sufficiently Similar Segment to any of the limitations of the query claim. As a result, what remains is prior art that is now also related to the query claim in terms of its content (each contains at least one Sufficiently similar segment).

The other remaining 20% is based on the: Abstract; Sibling Score; Patent classification; and random walk of link structure of the citation network. The software compares the abstract from the subject/target patent application/patent to the abstract in the prior art. The software compares the prior art on the face of the target patent to the prior art found during the patent search. The Patent classification analyzes the nodes between the predicted classifications of the application claims versus the actual classes of the prior art reference. This factor analyzes the similarity between the classifications of the query patent applications claims and the prior art classifications. The link structure looks at how likely it is to find references based on the nodes of classification in the citation graph of cited patents. The link structure analyzes the random-walk distance between the application claims and the prior art. The link structure includes two weighted factors in the formula/algorithm: Content similarity in corresponding prior art; and Classification strength. The NPL uses a machine learning classifier.

For each limitation of the claim, Zuse will show you up to 5 segments or snippets of the most relevant sections for each prior art reference. You can automatically add any of these segments/snippets to your claim chart. If the user selects a patent, they will see green, yellow, and red to see if the prior art disclosed those elements. The user is able to type in comments and click on thumbs up or thumbs down to state whether the prior art was good or bad. This helps improve the quality of the Zuse software.

The present invention also features a focused limitation search. For each limitation, the user will see the most relevant worldwide prior art references for each limitation. For example, the software could automatically break up the claim into about 5 different claim elements or limitations. Then the search software will find references for each claim limitation. The patent search tool can allow a person to highlight certain text in the claim. The user can select to give more weight/importance to those terms. The user can also set the search tool to: have certain words be required to be found during the search; have certain words be excluded during the search; and have certain words not be included during the search. The user can highlight certain text, and click on synonyms, resulting in a list of available synonyms. The user can also put a check mark next to the synonyms that should be added to the search. The user can manually edit the claims and limitations during the search, as well as add and delete the claim limitations.

The present invention is a patent analytics platform featuring a blockchain based patent registry that contains high-level metadata on each patent. The blockchain record for each patent will link to the patent analytics platform, where the full text of the patent (including diagrams) and a wealth of analytic information will be available to view or download. The platform is continuously updated to add patents from additional countries. The objective of the present invention is to eventually capture every patent in the world.

The present invention also provides a sophisticated search tool and analytics data. Two of the key analytics available from the present invention are the "Q-Score," a measure of patent quality, and the "V-Score," a measure of patent validity.

Q Score is the most advanced tool available for ranking the potential commercial value of a patent or a portfolio of patents. Other ranking methods typically rely heavily on a patent's reference graph (citations to/from other patents). Q Score is far more sophisticated: using data mining tokenization techniques, Q Score takes into account multiple factors correlated with patent value.

V Score is a measure of prior art related to the patent. It finds relevant prior art and analyzes how close the art is to what's covered in the patent. The algorithms find prior art that was used to invalidate similar patents. Hence, the present invention can assign a score that indicates how vulnerable a patent might be to challenge.

The present invention will also allow developers capture the data stored in the analytics platform via API for integration into other systems. The present invention also includes tools for claims analysis, in-depth analysis of individual patents, and comparative analysis of a portfolio of patents.

The present invention software features a spam filter that can check all communications, including emails, text, and fax. The software can look for "broken English" or other types of machine translations, that identifies the language appears to be a machine translation, and can check any language. If the software identifies a machine translation, then this will be a factor in the algorithm identifying the email as spam. Also, the software could notify the receiver of the email that there appears to be a machine translation, and the receiver could decide whether or not to open the email, or whether to have it go directly into the designated spam folder, or whether to have email automatically deleted. The receiver can set it up to have any spam emails (or emails that have machine translations) to automatically report the sender as sending spam.

The present invention software can check for bad grammar, or bad misspellings. If there is bad grammar or bad misspellings (such as quantity of misspellings or quality of misspellings, such as large misspellings of easy, simple words), the software could identify that the sender might be from a different country, different native home country language. If the software identifies bad grammar or bad misspelling (such as a person could manually set the number of threshold misspellings or bad grammar), then this will be a factor in the formula/algorithm identifying the email as spam. Also, the software could notify the receiver of the email that there appears to be bad grammar or bad misspellings, and the receiver could decide whether or not to open the email, or whether to have it go directly into spam/junk folder, or whether to have email automatically deleted. The receiver can set it up to have any spam emails (or emails that have bad grammar or bad misspellings) to automatically report the sender as sending spam.

A worldwide spam offender list could be generated. It could keep track of worldwide spammers, and the specific type of spam email, text, telemarketing calls, and fax. That way, the software could be set to automatically block anyone on this worldwide spam list. Some states and countries have anti-spam laws. Blockchain or software could be used to automatically file lawsuits against spammers. For example, the state of Missouri has an anti-spam fax law. Therefore, whenever a fax is received from a spammer, the blockchain or software could automatically report and sue the spammer.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

Exemplary Operating Environments, Components, and Technology

FIG. 1 is a block diagram illustrating components of an exemplary operating environment in which embodiments of the present invention may be implemented. The system 100 can include one or more user computers, computing devices, or processing devices 112, 114, 116, 118, which can be used to operate a client, such as a dedicated application, web browser, etc. The user computers 112, 114, 116, 118 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 112, 114, 116, 118 may also have any of a variety of applications, including one or more development systems, database client and/or server applications, and Web browser applications. Alternatively, the user computers 112, 114, 116, 118 may be any other electronic device, such as a thin-client computer, Internet-enabled gaming system, and/or personal messaging device, capable of communicating via a network (e.g., the network 110 described below) and/or displaying and navigating Web pages or other types of electronic documents. Although the exemplary system 100 is shown with four user computers, any number of user computers may be supported.

In most embodiments, the system 100 includes some type of network 110. The network can be any type of network familiar to those skilled in the art that can support data communications using any of a variety of commercially-available protocols, including without limitation TCP/IP, SNA, IPX, AppleTalk, and the like. Merely by way of example, the network 110 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 102, 104, 106 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 106) may be dedicated to running applications, such as a business application, a Web server, application server, etc. Such servers may be used to process requests from user computers 112, 114, 116, 118. The applications can also include any number of applications for controlling access to resources of the servers 102, 104, 106.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 112, 114, 116, 118. As one example, a server may execute one or more Web applications. The Web application may be implemented as one or more scripts or programs written in any programming language, such as Java.RTM., C, C# or C++, and/or any scripting language, such as Perl, Python, or TCL, as well as combinations of any programming/scripting languages. The server(s) may also include database servers, including without limitation those commercially available from Oracle.RTM., Microsoft.RTM, Sybase.RTM., IBM.RTM. and the like, which can process requests from database clients running on a user computer 112, 114, 116, 118.

The system 100 may also include one or more databases 120. The database(s) 120 may reside in a variety of locations. By way of example, a database 120 may reside on a storage medium local to (and/or resident in) one or more of the computers 102, 104, 106, 112, 114, 116, 118. Alternatively, it may be remote from any or all of the computers 102, 104, 106, 112, 114, 116, 118, and/or in communication (e.g., via the network 110) with one or more of these. In a particular set of embodiments, the database 120 may reside in a storage-area network ("SAN") familiar to those skilled in the art. Similarly, any necessary files for performing the functions attributed to the computers 102, 104, 106, 112, 114, 116, 118 may be stored locally on the respective computer and/or remotely, as appropriate. In one set of embodiments, the database 120 may be a relational database, such as Oracle 10 g, that is adapted to store, update, and retrieve data in response to SQL-formatted commands.

Figure 2:
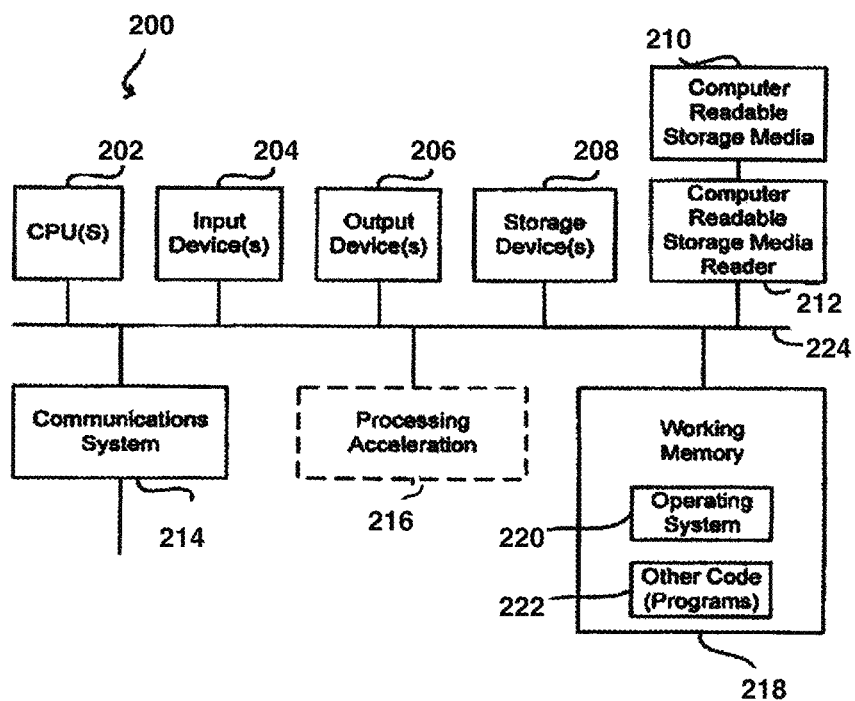
FIG. 2 is another illustration depicting an exemplary operating environment including a computer system with various elements as shown.

FIG. 2 illustrates an exemplary computer system 200, in which embodiments of the present invention may be implemented. The system 200 may be used to implement any of the computer systems described above. The computer system 200 is shown comprising hardware elements that may be electrically coupled via a bus 224. The hardware elements may include one or more central processing units (CPUs) 202, one or more input devices 204 (e.g., a mouse, a keyboard, etc.), and one or more output devices 206 (e.g., a display device, a printer, etc.). The computer system 200 may also include one or more storage devices 208. By way of example, the storage device(s) 208 can include devices such as disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 212, a communications system 214 (e.g., a modem, a network card (wireless or wired), an infra-red communication device, etc.), and working memory 218, which may include RAM and ROM devices as described above. In some embodiments, the computer system 200 may also include a processing acceleration unit 216, which can include a digital signal processor DSP, a special-purpose processor, and/or the like.

The computer-readable storage media reader 212 can further be connected to a computer-readable storage medium 210, together (and, optionally, in combination with storage device(s) 208) comprehensively representing remote, local, fixed, and/or removable storage devices plus storage media for temporarily and/or more permanently containing, storing, transmitting, and retrieving computer-readable information. The communications system 214 may permit data to be exchanged with the network and/or any other computer described above with respect to the system 200.

The computer system 200 may also comprise software elements, shown as being currently located within a working memory 218, including an operating system 220 and/or other code 222, such as an application program (which may be a client application, Web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

FIG. 2 further illustrates an environment where an on-demand distributed database service might be used. As illustrated in FIG. 2 user systems might interact via a network with an on-demand database. Some on-demand databases may store information from one or more records stored into tables of one or more distributed database images to form a database management system (DBMS). Accordingly, on-demand database and system will be used interchangeably herein. A database image may include one or more database objects. A relational database management system (RDMS) or the equivalent may execute storage and retrieval of information against the database object(s). Some on-demand database services may include an application platform that enables creation, managing and executing one or more applications developed by the provider of the on-demand database service, wherein users accesses the on-demand database service via user systems, or third party application developers access the on-demand database service via user systems.

The security of a particular user system might be entirely determined by permissions (permission levels) for the current user. For example, where a user account identification transaction may involve a portable identification alphanumeric data field physically or digitally linked to a personal primary identification device to request services from a provider account and wherein the user is using a particular user system to interact with System, that user system has the permissions allotted to that user account. However, while an administrator is using that user system to interact with System, that user system has the permissions allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different permissions with regard to accessing and modifying application and database information, depending on a user's security or permission level.

A network can be a LAN (local area network), WAN (wide area network), wireless network, point-to-point network, star network, token ring network, hub network, or other appropriate configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is a frequently implemented protocol.

User systems might communicate with a system using TCP/IP and, at a higher network level, use other common Internet protocols to communicate, such as HTTP, FTP, AFS, WAP, etc. In an example where HTTP is used, a user system might include an HTTP client commonly referred to as a "browser" for sending and receiving HTTP messages to and from an HTTP server at System. Such HTTP server might be implemented as the sole network interface between a system and network, but other techniques might be used as well or instead. In some implementations, the interface between a system and network includes load sharing functionality, such as round-robin HTTP request distributors to balance loads and distribute incoming HTTP requests evenly over a plurality of servers. At least as for the users that are accessing that server, each of the plurality of servers has access to at least one third party entity system data schema; however, other alternative configurations are contemplated.

According to one arrangement, each user system and all of its components are operator configurable using applications, such as a browser, including computer code run using a central processing unit such as an Intel Pentium.RTM. processor or the like. Similarly, a computer system (and additional instances of an enterprise database, where more than one is present) and all of their components might be operator configurable using application(s) including computer code run using a central processing unit such as an Intel Pentium.RTM. processor or the like, or multiple processor units. A computer program product aspect includes a machine-readable storage medium (media) having instructions stored thereon/in which can be used to program a computer to perform any of the processes of the embodiments described herein. Computer code for operating and configuring systems to intercommunicate and to process web pages, applications and other data and media content as described herein is preferably downloaded and stored on a hard disk, but the entire program code, or portions thereof, may also be locally stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a client system and/or server or server system such as, for example, in C, C++, HTML, any other markup language, Java.TM., JavaScript, ActiveX, any other scripting language such as VBScript, and many other programming languages as are well known. (Java.RTM. is a trademark of Sun Microsystems, Inc.).

In one embodiment, the present invention contains a method of transactions wherein all fees, payments, purchases, and services are transacted using virtual currency, or cryptocurrency. The Network can further reward various stakeholders for participation within the network using the same cryptocurrency tokens. Each token can be traded or transacted using various systems and converted to FIAT currency. Such a system is applicable as a blockchain network.

A block chain or blockchain is a distributed database that maintains a list of data records, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies such as used in bitcoin. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger.

The blockchain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person), and blocks are created by users known as "miners" who use specialized software/equipment to create blocks. In some embodiments, the block chain system disclosed, SS the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases, that meets other criteria.

In one embodiment, the Network is made up of a plurality of nodes, each node connected to another node in the plurality of nodes, having the ability to pass data to each of the connected plurality of nodes. At least one node of the plurality of nodes is connected to an existing blockchain. Using this existing blockchain the, decentralized transactions can take place.

Figure 3:
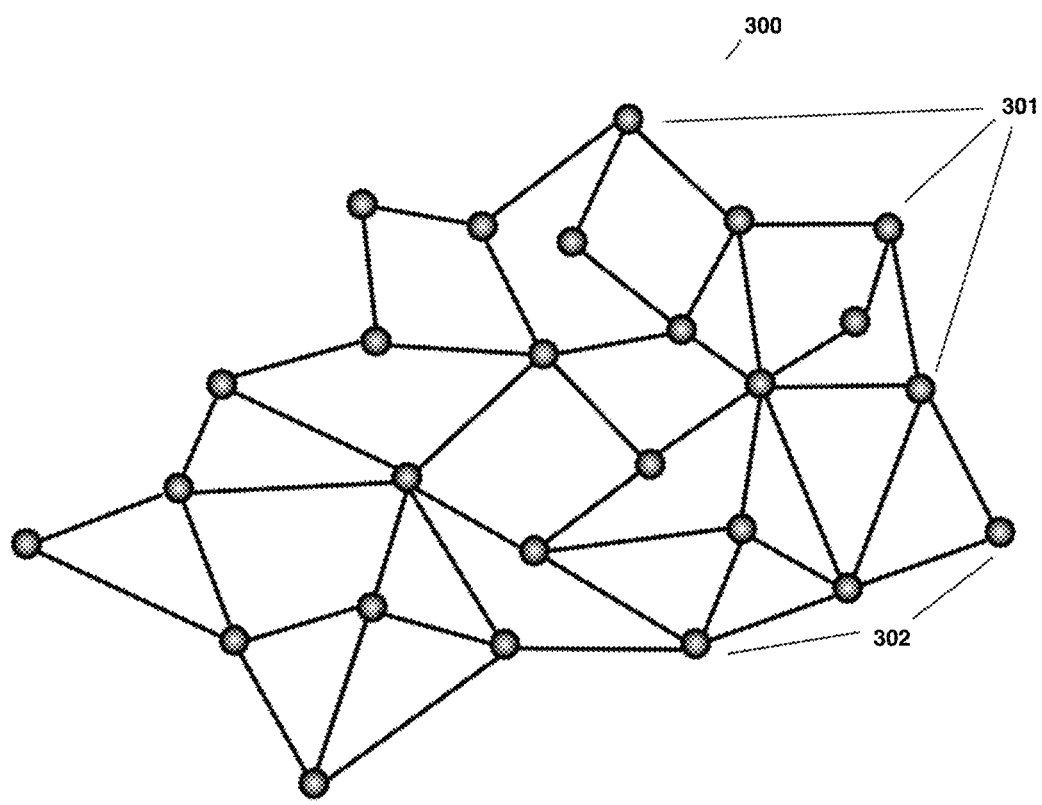
FIG. 3 is an illustration of one aspect of the present invention.

FIG. 3 depicts one aspect of the present invention. Specifically, the illustration shows the interconnection of each node 301 in a distributed decentralized network 300. In accordance with the preferred embodiment of the present invention, each node 301 in the distributed network 300 is directly connected to at least two other nodes 302. This allows each node 301 to transact with at least one other node 301 in the network.

The above illustrations provide many different embodiments for implementing different features of the invention. Specific embodiments of components and processes are described to help clarify the invention. These are, of course, merely embodiments and are not intended to limit the invention from that described in the claims.

Persons of ordinary skill in the art will realize that the foregoing description is illustrative only and not in any way limiting. Other modifications and improvements will readily suggest themselves to such skilled persons having the benefit of this disclosure.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A patent search tool system comprising:

a. a memory that stores processor-executed software modules; and
b. one or more processors in communication with the memory and configured to:
   i. execute instructions stored on the memory; and
   ii. automatically separate a claim into limitations or elements, and find prior art references for every limitation or element;
      wherein the software modules automatically break up the claim into a plurality of claim elements; and
      wherein the patent search tool allows a user to highlight certain text within said claim; and
      wherein said user is provided an interface to give more weight to said highlighted claim term and
      wherein said user can set the search tool to have certain words be required to be found during the search and have certain words be excluded during the search; and
      wherein said user can highlight certain text and click on synonyms, resulting in a list of available synonyms that should be added to the search; and
      wherein said user may manually edit said claims and claim elements during the search, as well as add and delete said claim elements for establishing allowable subject matter and,
      wherein a user can save said patent search tool strategies for each classification of said patent, and,
      wherein said predicted classifications of patent application claims can utilize previously saved search strategies.

2. A patent search tool system, the system comprising:
a. A computer;
b. a memory that stores processor-executed software modules; and
c. one or more processors in communication with the memory and configured to:
   i. execute instructions stored on the memory; and
   ii. produce a patent validity score utilizing the factors: similar text segments, abstract score, sibling score, classification score, and random walk score, and
      wherein said patent search tool identifies relevant prior art by evaluating said highlighted claim elements and comparing said highlighted claim elements with prior art text and link structure of a citation network wherein said citation network includes a patent classification system; and
      wherein the patent search tool constructs a network that consists of art nodes and classification nodes; and
      wherein each art node is linked to all art nodes that it cites and all classification nodes it belongs to; and
      wherein said patent classification is utilized by said computer to compare the nodes between the predicted classifications of patent application claims with actual classes of said prior art reference text; and
      wherein said link structure is categorized by said computer to determine how likely it is to find references based on the nodes of classification in said citation network of cited patents and analyzes a random walk distance between patent application claims and said prior art.

3. A patent search tool system comprising:
a. a computer;
b. a memory that stores processor-executed software modules; and
c. one or more processors in communication with the memory and configured to:
   i. execute instructions stored on the memory; and
   ii. produce a patent quality score utilizing the factors: similar text segments, abstract score, sibling score, classification score, and random walk score;
      wherein the patent search tool identifies relevant prior art by utilizing a computer, wherein said computer evaluates limitations of a claim under construction, text of prior art, a link structure of a citation network and a patent classification; and
      wherein the patent search tool constructs a network that consists of art nodes and classification nodes; and
      wherein each art node is linked to all art nodes that it cites and all classification nodes it belongs to; and
      wherein a patent classification is utilized by said computer to analyze the nodes between the predicted classifications of a patent application in comparison to actual classes of the prior art reference; and
      wherein a link structure is evaluated by said computer to determine how likely it is to find references based on the nodes of classification within said citation network of cited patents and in turn, said computer analyzes the random walk distance between said patent application claims and the prior art.

4. The patent search tool of claim 3, wherein at least one processor comprises a programmable logic device.

5. The patent search tool of claim 3, wherein at least one processor comprises an application specific integrated circuit.

6. The patent search tool of claim 3, wherein at least one processor-executed software module can be installed in a storage media selected from the group consisting of random-access memory (RAM), memory, read-only memory (ROM), electrically programmable ROM, electrically erasable programmable ROM, registers, hard drives, removable disks, and CD-ROM.

* * * * *